M. P. MONTE.
LAND GRADER.
APPLICATION FILED MAY 14, 1913.
1,105,817.
Patented Aug. 4, 1914.
3 SHEETS—SHEET 1.
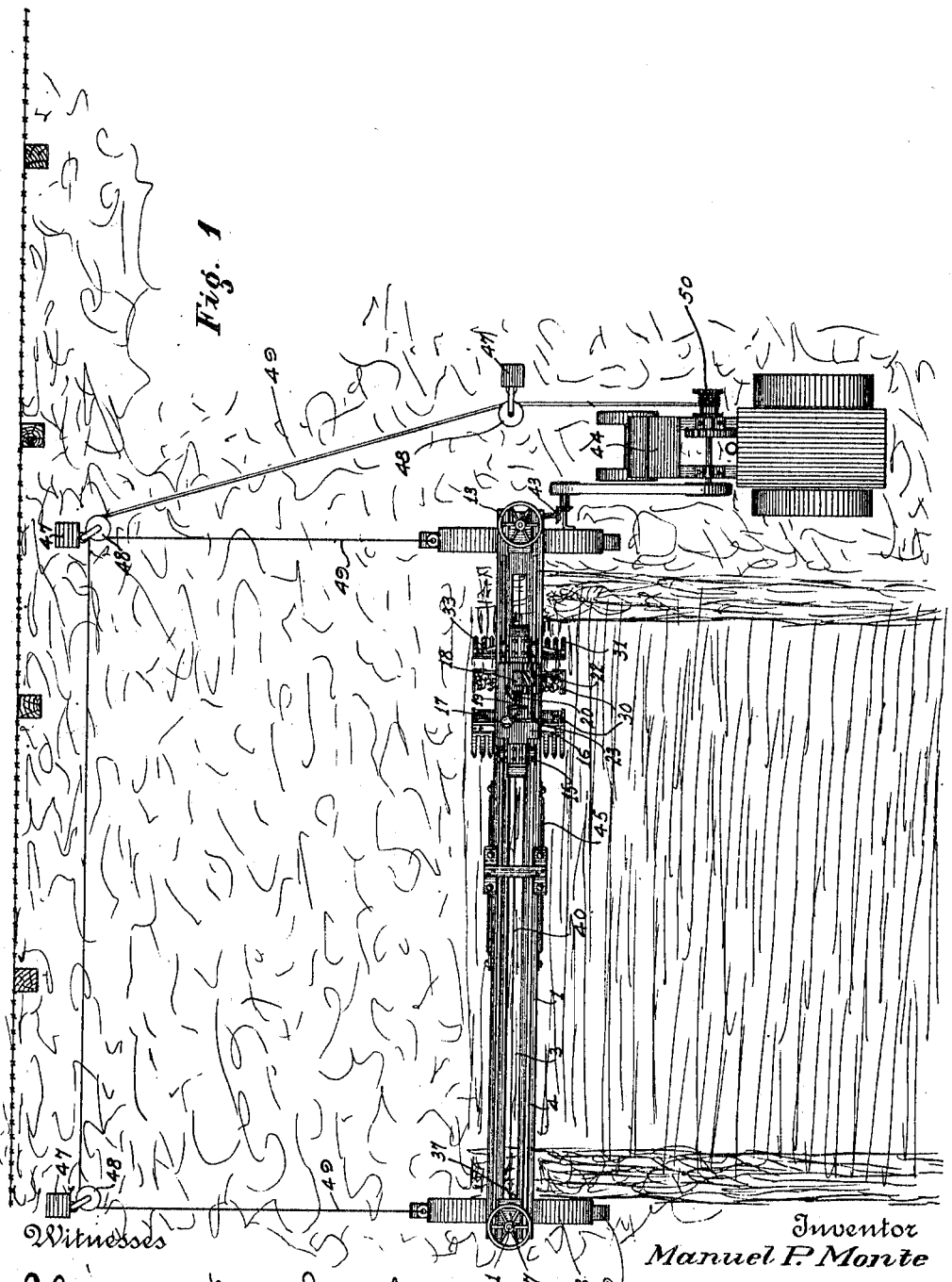
Witnesses
Clarence M. Smith
J. B. Webster
Inventor
Manuel P. Monte
by Attorney

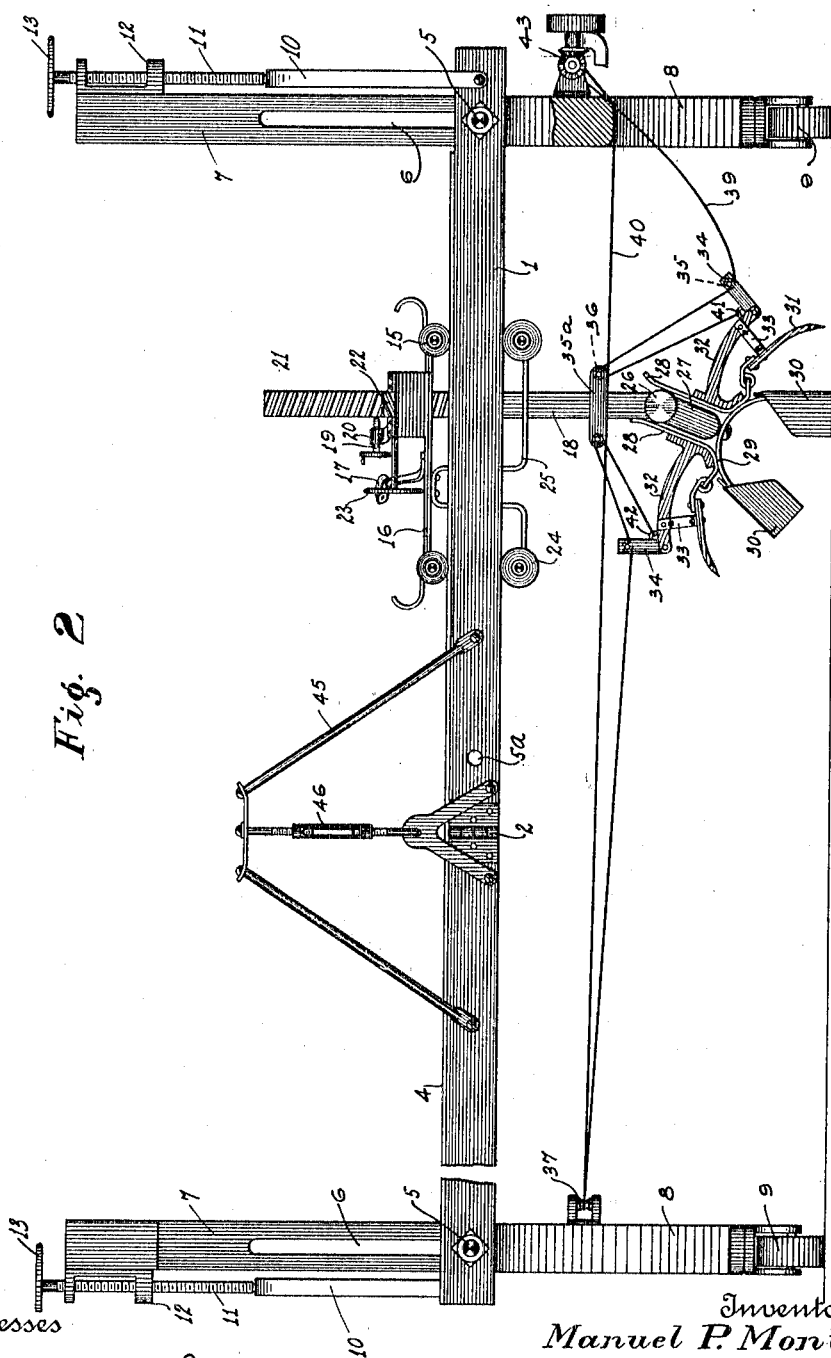

M. P. MONTE.
LAND GRADER.
APPLICATION FILED MAY 14, 1913.

1,105,817.

Patented Aug. 4, 1914.

3 SHEETS—SHEET 3.

Witnesses
Clarence M. Smith
J. B. Webster

Inventor
Manuel P. Monte

Attorney

UNITED STATES PATENT OFFICE.

MANUEL P. MONTE, OF STOCKTON, CALIFORNIA.

LAND-GRADER.

1,105,817.  Specification of Letters Patent.  Patented Aug. 4, 1914.

Application filed May 14, 1913. Serial No. 767,570.

*To all whom it may concern:*

Be it known that I, MANUEL P. MONTE, a citizen of the United States, residing at Stockton, in the county of San Joaquin, State of California, have invented certain new and useful Improvements in Land-Graders; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in devices for grading land, the object of the invention being to produce such a device as may be positioned at one point and then operated to thoroughly level and grade a predetermined piece of land in a rapid and effective manner.

A further object of the invention is to produce a grader which will, when once positioned, automatically grade and level the land until it is perfectly level, all of which can be done without the necessity of using leveling instruments of any kind.

Another object of the invention is to produce a power operated grader which will, when positioned, move backward and forward automatically until the ground over which it is working is perfectly level and which is then capable of being moved along a short ways and the leveling operation repeated and so on until a large predetermined strip of land is leveled.

A still further object of the invention is to produce a device which has various adjustments whereby the same is fixed at a level and also whereby the same can be extended or shortened accordingly as a larger or smaller strip of land is to be leveled.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 4:
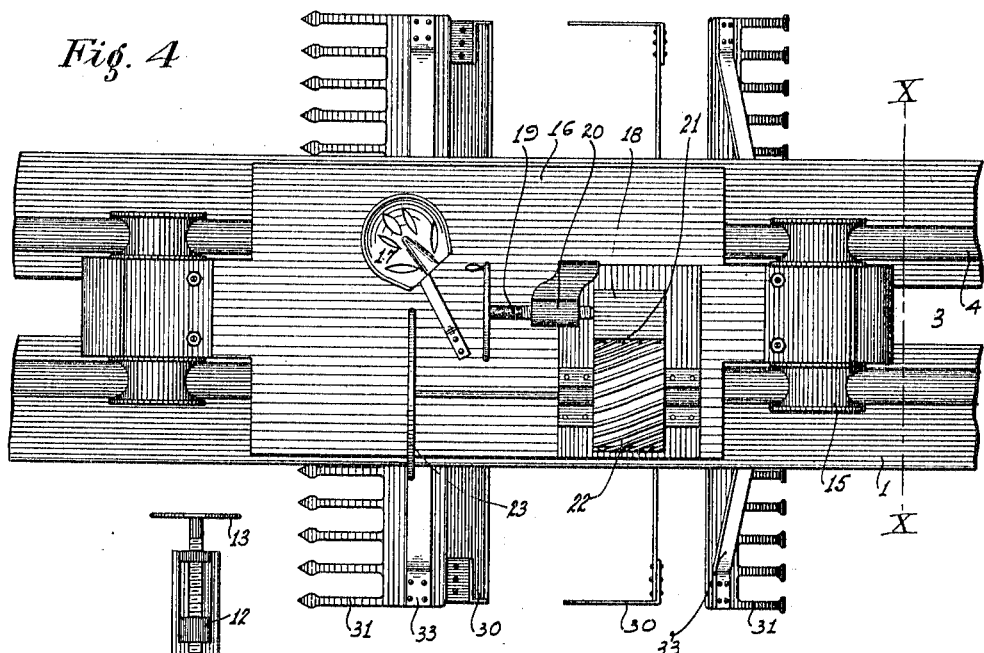
Figure 3:
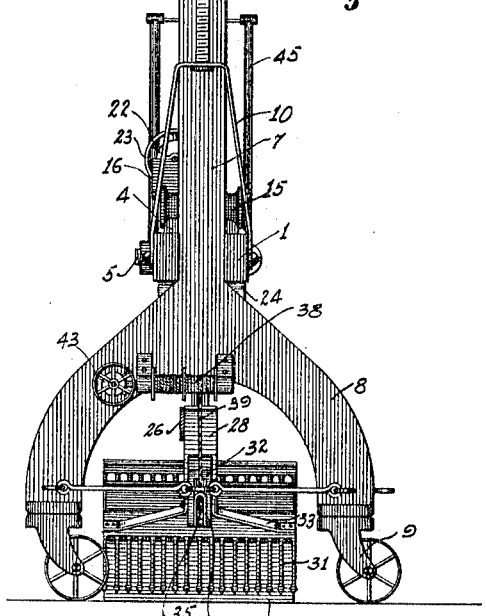
Figure 5:
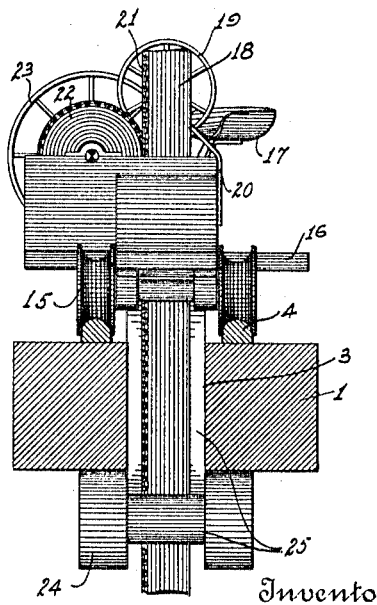

Figure 1 is a top plan view of the complete device, as it appears when in operation. Fig. 2 is a side elevation of the grader. Fig. 3 is an end view of the complete device. Fig. 4 is a top plan view of a fragmentary portion of the device showing the grading plows and harrows and the adjusting means therefor. Fig. 5 is a sectional view taken on a line X—X of Fig. 4 showing the adjusting means for the plows and harrows of the device.

Referring now more particularly to the characters of reference on the drawings, the numeral 1 designates the main frame of the device which consists of two or more members suitably hinged as at 2 and provided with a central slot 3 on each side of which slot the said member 1 is provided with tracks or runners 4. At each end of the member 1 is a bolt 5 adapted to project through a slot 6 in a vertical beam 7 having at its lower ends a pair of spaced branches 8, each branch carrying in its lower end a turnable wheel 9 on which wheels the entire device is supported.

Secured on each end of the member 1 is a yoke 10 having freely turnably mounted therein a threaded pin 11, which pins project in a threaded manner through projecting flanges 12 on the upper end of each of the members 7, said pins 11 being provided with operating wheels 13 on their upper ends. By means of the structure just described the frame 1 may be adjusted to a level position irrespective of the positions of the members 7 by loosening the bolts 5 and operating the wheels 13 to adjust the member 1 on the members 7 to a level position. This level position can be determined by placing a level on the member 1 or by having a level glass carried continuously by said member 1. Then when this member 1 is set at a level position, the bolts 5 may be again tightened and the grading plows and harrows are then suspended on the members 1 and moved backwardly and forwardly on the same by means of the following structure, to-wit: Mounted on the member 1 on each side of the slot 3 are the rails 4 over which operate wheeled trucks 15 carrying a platform 16 on which is mounted the seat 17 for the operator. Movable vertically through the platform 16 and projecting through the slot 3 is a beam 18 held in fixed position by a set screw 19 operating from a frame 20 on the platform 16. One side of the beam 18 is provided with a gear rack 21 intermeshing with which is a gear 22 adapted to be operated by a wheel 23 journaled on a platform 16 whereby by the operation of the said wheel 23, the beam 18 may be raised or lowered and then fixed in position by means of the set screw 19. The wheeled trucks 15 are held in position on the trucks 14 by means of rollers 24 bearing against the undersides of the members 1 and connected by frames 25, projecting through the slot 3, to the platform 16. On the lower end of the beam 18 are mounted the grading plows and harrows, which structure consists of a pin 26 disposed on the lower end of said beam 18 swingingly mounted on which pin is a projecting arm 27. The plow structure then consists of two guides 28 secured to the lower end of which is a curving member 29 and on each end of each curving member is a grading plow or scraper 30. Connected to the end of each member 28 and extending to the rear of each plow or scraper 30 is a harrow or scarifying member 31. An arm 32 projects from each of the members 28 above the members 31 and are connected to said members 31 by brace members 33. On the outer end of each arm 32 is another projecting arm 34 carrying in its outer end a pulley 35. Secured to the member 18 above the pin 26 is a cross arm 35$^a$ having a roller 36 in each end. On one of the members 7 there is a drum 37 and on the other there is a drum 38. Secured to the drum 38 are two cables 39 and 40. The cable 39 projects under one of the rollers 35 over the corresponding roller 36 and is then connected back between the corresponding arms 34 and 32 as at 41. The other cable 40 projects across and around the drum 37 and then under the other roller 35 over the corresponding roller 36 and is similarly connected between the corresponding arms 34 and 32 as at 42.

With the operation of the drum 38 which is driven by suitable gearing 43 operated by a tractor 44, one or the other of the cables 39 or 40 is operated according to the direction in which the drum 38 is operating. This then first swings the scraping mechanism on its pivotal point 26 until one of the members 28 engages the beam 18 which stops the pivotal movement and then the continuation of the pulling on the cable drags the beam 18 and all its connected parts along the track members 4 which causes that scraper 30 which is in engagement with the ground to scrape the ground for the full length of the device, the harrowing means 31 loosening the ground behind the scraper so that when the device is reversed the ground will be loosened and more easily scraped. Then when the scraping mechanism reaches one end or the other of the device the engine is reversed and the other cable is wound up on the drum 38 which reverses the position of the scraper mechanism and then reverses its movement as will appear and by this means the same may be swung backwardly and forwardly until the ground underneath the member 1 is graded to the same level as the said member 1 and since the member 1 can be set level by the adjustment means this assures the grading of the ground to a perfect level.

As has been noted the member 1 is formed in two parts hinged together as at 2 and suitably braced by supporting trunnions 45 having a center turnbuckle adjustment 46 in order to hold the same perfectly level and rigid. When however the device is to be transported, the brace may be removed and one of the bolts 5 loosened and the members 1 on one side of the hinge 2 turned backwardly to project along the sides of the other ones, the members 7 having been previously operated forward and connected to the stationary half by means of projecting the bolt 5 through holes 5$^a$.

When one stretch of land is to be graded, posts 47 may be positioned at proper points and provided with pulleys 48 over which may extend cables 49 adapted to be operated by a drum 50 on the tractor 44 whereby first one stretch of land is graded underneath the device which may be advanced then to another position until a large surface has been suitably graded, all of which will be perfectly level as can be seen since the device when once set level cannot do otherwise than level the land beneath it.

My device may be found especially adaptable for grading land for irrigation purposes but also can be used in any capacity where grading land is required such as the filling in of low places, ditches or in fact any class of grading work.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

1. A device of the character described comprising a supporting frame, a carrier movable along said supporting frame, a swinging frame on the lower end of said carrier, a cultivating means on each side of said swinging frame, means for moving said carrier forward and backward on said supporting frame and means for swinging said swinging frame when said carrier reaches each end of said supporting frame, as described.

2. A device of the character described comprising a supporting frame, a carrier movable on said supporting frame, a swinging frame on the lower end of said carrier, a cultivating means carried on each side of said swinging frame, means on said carrier for adjusting said swinging frame vertically, and means for swinging said swinging frame, as described.

3. A device of the character described comprising a supporting frame, a carrier movable on said supporting frame, a swinging frame on said carrier, a pair of spaced scrapers mounted on said swinging frame, a cultivator mounted on said swinging frame at a spaced distance from each of said scrapers, and means for swinging said swinging frame, as described.

4. A device of the character described comprising a supporting frame, a carrier movable on said supporting frame, an arm swinging on the lower end of said carrier, a supporting member secured at the lower end of said arm and carrying a pair of spaced scrapers, a guide secured on said supporting member on each side of said arm and adapted to engage the lower end of said carrier, and a cable connected at spaced points at the ends of said supporting frame and adapted to operate said carrier back and forth on said supporting frame and at the same time swing said swinging arm when said carrier reaches each end of said supporting frame, as described.

5. A device of the character described comprising a supporting frame, a carrier movable on said supporting frame and having a vertical beam, an arm pivotally mounted on the lower end of said beam, a supporting frame on the lower end of said arm, a pair of spaced scrapers on said supporting frame, a guide on said supporting frame on each side of said arm, said guides being adapted to engage said vertical beam, a cross member on said vertical beam provided with a pulley at each end, an arm on each of said guides each being provided with a pulley at its outer end, a pair of cables connected with each of said last named arms and projecting over one of the pulleys on said cross member and thence under the pulley on the corresponding arm, and means for operating each of said cables, as described.

In testimony whereof I affix my signature in presence of two witnesses.

MANUEL P. MONTE.

Witnesses:
   STEPHEN K. BLEWETT,
   CLARENCE M. SMITH.

---

Copies of this patent may be obtained for five cents each, by addressing the "Commissioner of Patents, Washington, D. C."